(12) United States Patent
Tsuda et al.

(10) Patent No.: US 7,834,084 B2
(45) Date of Patent: Nov. 16, 2010

(54) LIGHT STABILIZER EMULSION COMPOSITION AND AQUEOUS COATING AGENT COMPOSITION CONTAINING THE SAME

(75) Inventors: Takayuki Tsuda, Tokyo (JP); Masatoshi Honma, Tokyo (JP); Koji Beppu, Tokyo (JP)

(73) Assignee: Adeka Corporation, Tokyo (JP)

( * ) Notice: Subject to any disclaimer, the term of this patent is extended or adjusted under 35 U.S.C. 154(b) by 356 days.

(21) Appl. No.: 11/659,286

(22) PCT Filed: Jul. 12, 2005

(86) PCT No.: PCT/JP2005/012807
§ 371 (c)(1),
(2), (4) Date: Feb. 15, 2007

(87) PCT Pub. No.: WO2006/013703
PCT Pub. Date: Feb. 9, 2006

(65) Prior Publication Data
US 2007/0240615 A1    Oct. 18, 2007

(30) Foreign Application Priority Data
Aug. 4, 2004    (JP) .............................. 2004-228397

(51) Int. Cl.
*C08K 5/34*    (2006.01)
(52) U.S. Cl. .................................. 524/612; 106/287.23
(58) Field of Classification Search ............ 106/287.23; 524/612
See application file for complete search history.

(56) References Cited

U.S. PATENT DOCUMENTS 5,772,920 A  *  6/1998  Best et al. ................... 252/403

6,271,307 B1     8/2001  Huff et al.
2004/0110655 A1  6/2004  Yamashita et al.

FOREIGN PATENT DOCUMENTS

| JP | 54-15278 | 2/1979 |
|----|----------|--------|
| JP | 8-268858 | 10/1996 |
| JP | 11-80486 | 3/1999 |
| JP | 2002-285045 | 10/2002 |
| JP | 2003-261759 | * 9/2003 |
| WO | 94/07460 | 4/1994 |

OTHER PUBLICATIONS

Supplementary European Search Report issued Dec. 29, 2008 in Application No. EP 05 76 5655.

* cited by examiner

*Primary Examiner*—Ling-Siu Choi
*Assistant Examiner*—Chun-Cheng Wang
(74) *Attorney, Agent, or Firm*—Wenderoth, Lind & Ponack, L.L.P.

(57) ABSTRACT

An object of the present invention is to provide: a light stabilizer emulsion composition which has good long-term storage stability and does not deteriorate various physical properties of a coating film to be formed even when the composition is added to an aqueous coating agent composition; and an aqueous coating agent composition containing the light stabilizer emulsion composition. The light stabilizer emulsion composition of the present invention is characterized by containing: an emulsifier having as a hydrophilic group a polyether chain obtained by a reaction between two or more kinds of alkyleneoxides and having as a hydrophobic group a hydrocarbon group having 1 to 30 carbon atoms; at least one of a light stabilizer and a UV absorber; and water. Further, the aqueous coating agent composition of the present invention is characterized by containing the light stabilizer emulsion composition.

8 Claims, No Drawings

LIGHT STABILIZER EMULSION COMPOSITION AND AQUEOUS COATING AGENT COMPOSITION CONTAINING THE SAME

TECHNICAL FIELD

The present invention relates to a light stabilizer emulsion composition for imparting weatherability to various aqueous coating agent compositions and to an aqueous coating agent composition containing the light stabilizer emulsion composition.

BACKGROUND ART

The number of coating agent compositions using water but not an organic solvent has been increasing in view of, for example, recent environmental problems. Examples of applications of the coating agent compositions include aqueous paint, aqueous ink, optical coating agents, agents for fibers, and agents for paper. A coating agent composition to be used for such applications has a UV absorber or a light stabilizer such as a radical scavenger added for improving the weatherability of a formed coating film in some cases. However, such light stabilizers have a problem in that, when the light stabilizer is added to an aqueous composition, the blended light stabilizer is not dispersed well, so a formed coating film does not have sufficient weatherability because the light stabilizer is generally an oil-soluble organic compound. The light stabilizers have another problem in that a coating agent composition with the light stabilizer added involves the separation of the light stabilizer during storage of the composition, thereby resulting in poor storage stability.

To cope with the foregoing, in an application where an aqueous emulsion is used, for example, the addition of a light stabilizer when polymerizing the aqueous emulsion has been known. For example, Patent Document 1 discloses an acryl silicone emulsion composition obtained by the emulsion polymerization of a mixture containing: a monomer mixture composed of 30 to 96 wt % (mass %) of a (meth)acrylate monomer (1), 1 to 10 wt % (mass %) of one kind of specific polymerizable carboxylic acid (2) or a mixture of two or more kinds of the carboxylic acids, 1 to 10 wt % (mass %) of a polymerizable emulsifier (3), 1 to 20 wt % (mass %) of a benzophenone- or benzotriazole-based polymerizable light stabilizer (4), and 1 to 30 wt % (mass %) of an organoalkoxysilane compound (5) having at least one glycidyl group in one molecule thereof (the total amount being 100 wt % (mass %)); and 0.1 to 5 wt % (mass %) of a hindered amine-based light stabilizer (HALS) (6) having a base constant (PKb) of 8 or more (claim 1).

In addition, Patent Document 2 discloses an aqueous paint composition containing (A) a fluoroolefin-based copolymer emulsion and (B) a copolymer emulsion containing a UV absorber and/or a light stabilizer obtained by the emulsion polymerization of a mixture of: a monomer mixture composed of (a) 5 to 70 wt % (mass %) of a polymerizable unsaturated monomer having a cycloalkyl group and (b) 30 to 95 wt % (mass %) of any other polymerizable unsaturated monomer; and (c) the UV absorber and/or the light stabilizer (claim 1). In addition, paragraph [0016] of Patent Document 2 discloses a UV absorber such as a salicylic acid derivative or a benzophenone- or benzotriazole-based UV absorber and a light stabilizer such as a hindered amine derivative.

A method involving: emulsifying or dispersing a light stabilizer into water in advance; and adding the resultant to an aqueous emulsion has also been known. For example, Patent Document 3 discloses: a light stabilizer aqueous emulsion composition containing a light stabilizer, an emulsifier, and water, in which the content of the light stabilizer is 20 to 85 mass % (claim 1); and the light stabilizer aqueous emulsion in which the light stabilizer is a triazine-based UV absorber (claim 3). The light stabilizer aqueous emulsion can be added to an aqueous emulsion or an aqueous coating agent composition later. Therefore, the light stabilizer aqueous emulsion is advantageous in that it has an extremely simple structure and easily exhibits the functions of so-called weatherability.

Patent Document 1: JP 11-080486 A, Claims
Patent Document 2: JP 2002-285045 A, Claims, paragraph
Patent Document 3: JP 2003-261759 A, Claims,

DISCLOSURE OF THE INVENTION

Problems to be Solved by the Invention

According to Patent Document 1 and 2 described above, a light stabilizer can be uniformly dispersed into an aqueous emulsion. However, the light stabilizer is captured by emulsion particles, so there arises a problem in that sufficient weatherability cannot be imparted to a formed coating film.

In addition, the light stabilizer aqueous emulsion of Patent Document 3 prepared by emulsifying or dispersing a light stabilizer into water has poor storage stability and therefore a light stabilizer cannot be emulsified into water in a stable state for a long period of time. Therefore, the light stabilizer emulsion composition has a problem in that it may be separated in some cases when added to an aqueous coating agent composition and thus cannot be uniformly blended together. Furthermore, the formation of a coating film by means of an aqueous coating agent composition with the light stabilizer aqueous emulsion added has a problem of deterioration of various physical properties of the coating film such as the deterioration of gloss.

Therefore, an object of the present invention is to provide: a light stabilizer emulsion composition which has good long-term storage stability and in which various physical properties of a coating film to be formed do not deteriorate even when the composition is added to an aqueous coating agent composition; and an aqueous coating agent composition containing the light stabilizer emulsion composition.

Means for Solving the Problems

To this end, the inventors of the present invention have found that, there can be obtained a light stabilizer emulsion composition which has good long-term storage stability and in which various physical properties of a formed coating film do not deteriorate by blending an emulsifier having a specific structure thereinto, even when the composition is added to an aqueous coating agent composition, thus, completing the present invention.

That is, a light stabilizer emulsion composition according to the present invention is characterized by containing: an emulsifier having as a hydrophilic group a polyether chain obtained by a reaction between two or more kinds of alkyleneoxides and having as a hydrophobic group a hydrocarbon group having 1 to 30 carbon atoms; a light stabilizer and/or a UV absorber (hereinafter, collectively referred to as a "light stabilizer or the like" in the specification); and water.

Further, an aqueous coating agent composition according to the present invention is characterized by containing the light stabilizer emulsion composition.

Furthermore, a coated product according to the present invention is characterized by having a coating film formed of the above-mentioned aqueous coating agent composition.

Effect of the Invention

The light stabilizer emulsion composition of the present invention has good long-term storage stability and an effect of improving weatherability of a coating film without deterioration of the various physical properties of the coating film to be formed by an aqueous coating agent composition with the light stabilizer emulsion composition added.

BEST MODE FOR CARRYING OUT THE INVENTION

Examples of the emulsifier having as a hydrophilic group a polyether chain obtained by a reaction between two or more kinds of alkyleneoxides and having as a hydrophobic group a hydrocarbon group having 1 to 30 carbon atoms include: ethers such as an alkyl (or alkenyl)ether of a polyoxyethylene/polyoxypropylene block or random copolymer, an alkyl (or alkenyl)phenyl ether of a polyoxyethylene/polyoxypropylene block or random copolymer, and a polysaccharide, monosaccharide, or oligosaccharide ether of a polyoxyethylene/polyoxypropylene block or random copolymer; and esters such as an aliphatic ester of a polyoxyethylene/polyoxypropylene block or random copolymer and an ester obtained by an esterification reaction between any one of the above ethers and an aliphatic acid.

Of those compounds, the emulsifier as represented by the following general formula (I) is particularly preferable.

$$R\text{—}O\text{-}(AO)_n\text{—}H \qquad (1)$$

(In the formula, R represents a hydrocarbon group having 8 to 30 carbon atoms, A represents two or more kinds of alkylene groups each having 2 to 4 carbon atoms, ethylene groups account for 50 mol % or more of all A's, and n represents a number of 8 to 80.)

In the general formula (1), R represents a hydrocarbon group having 8 to 30 carbon atoms. Examples of the hydrocarbon group include an alkyl group, an alkenyl group, and an aryl group.

Examples of the alkyl group include octyl, 2-ethylhexyl, secondary octyl, nonyl, secondary nonyl, decyl, secondary decyl, undecyl, secondary undecyl, dodecyl, secondary dodecyl, tridecyl, isotridecyl, secondary tridecyl, tetradecyl, secondary tetradecyl, hexadecyl, secondary hexadecyl, stearyl, eicosyl, docosyl, tetracosyl, triacontyl, 2-butyloctyl, 2-butyldecyl, 2-hexyloctyl, 2-hexyldecyl, 2-octyldecyl, 2-hexyldodecyl, 2-octyldodecyl, 2-decyltetradecyl, 2-dodecylhexadecyl, 2-hexadecyloctadecyl, 2-tetradecyloctadecyl, monomethyl branched-isostearyl, eicosyl, heneicosyl, docosyl, tricosyl, tetracosyl, pentacosyl, hexacosyl, heptacosyl, octacosyl, nonacosyl, and triacontyl groups.

Examples of the alkenyl group include octenyl, nonenyl, decenyl, undecenyl, dodecenyl, tetradecenyl, and oleyl groups.

Examples of the aryl group include xylyl, cumenyl, mesityl, phenethyl, styryl, cinnamyl, benzhydryl, trityl, ethylphenyl, propylphenyl, butylphenyl, pentylphenyl, hexylphenyl, heptylphenyl, octylphenyl, nonylphenyl, decylphenyl, undecylphenyl, dodecylphenyl, styrenated phenyl, p-cumylphenyl, phenylphenyl, benzylphenyl, α-naphthyl, and β-naphthyl groups.

Of those hydrocarbon groups, R preferably represents an alkyl group or an alkenyl group without a benzene ring, and has 8 to 24 carbon atoms, or more preferably has 8 to 20 carbon atoms.

Next, in the general formula (1), A represents two or more kinds of alkylene groups each having 2 to 4 carbon atoms. Examples of a group represented by A include ethylene, propylene, methylethylene, butylene, 1-methylpropylene, 2-methylpropylene, and ethylethylene groups. Those groups can be derived from, for example, ethylene oxide, propylene oxide, butylene oxide, tetrahydrofuran, (1,4-butyleneoxide) or the like.

A combination of A's may be any combination of two or more kinds of alkylene groups, and a combination of an ethylene group derived from ethylene oxide and an alkylene group derived from any other alkylene oxide is preferable. Propylene oxide or butylene oxide is a preferable alkylene oxide to be combined with an ethylene group, and propylene oxide is the most preferable alkylene oxide to be combined therewith. The polymerization form of an alkylene oxide to be added is not limited, and, for example, a random copolymer, block copolymer, or random/block copolymer of ethylene oxide and one or two or more kinds of any other alkylene oxides is available. Of those, a random copolymer is preferable in terms of the stability of the light stabilizer emulsion composition and the size of an emulsion particle.

Ethylene groups account for 50 mol % or more, preferably 50 to 99 mol %, more preferably 60 to 95 mol %, or still more preferably 68 to 92 mol % of an entirety of A's in terms of emulsifiability. A ratio of ethylene groups of less than 50 mol % is not preferable because the performance as an emulsifier is not sufficiently exerted, and the light stabilizer emulsion composition cannot be uniformly emulsified. A ratio of ethylene groups of 100 mol % is not preferable either because melting point increases, so storage stability deteriorates owing to, for example, precipitation, and, furthermore, when the light stabilizer emulsion composition is added to an aqueous coating agent composition and the whole is formed into a coating film, the physical properties of the formed coating film such as gloss in the case of paint or the like deteriorate.

Furthermore in the general formula (1), n represents a number of 8 to 80, preferably 8 to 70, more preferably 10 to 60, or still more preferably 10 to 50. The case where n is less than 8 is not preferable because the performance of an emulsifier is not sufficiently exerted in some cases and n in excess of 80 is not preferable either because emulsion stability may deteriorate.

The light stabilizer emulsion composition of the present invention is a composition containing the above emulsifier represented by the general formula (1), water, and a light stabilizer or the like. Hindered amine-based light stabilizers or a UV absorbers such as benzophenones-, benzotriazole-, triazines-, benzoates-, oxanilides-, cyanoacrylates-based or the like can be used as the light stabilizer or the like.

Examples of the hindered amine-based light stabilizer include: 2,2,6,6-tetramethyl-4-piperidyl stearate; 1,2,2,6,6-pentamethyl-4-piperidyl benzoate; N-(2,2,6,6-tetramethyl-4-piperidyl)dodecylsuccinic acid imide; 1-[(3,5-ditertiary-butyl-4-hydroxyphenyl)propionyloxyethyl]-2,2,6,6-tetramethyl-4-piperidyl-(3,5-ditertiary-butyl-4-hydroxyphenyl)propionate; bis(2,2,6,6-tetramethyl-4-piperidyl)sebacate; bis(1,2,2,6,6-pentamethyl-4-piperidyl)sebacate; bis(1,2,2,6,6-pentamethyl-4-piperidyl)-2-butyl-2-(3,5-ditertiary-butyl-4-hydroxybenzyl)malonate; N,N'-bis(2,2,6,6-tetramethyl-4-piperidyl)hexamethylenediamine; tetra(2,2,6,6-tetramethyl-4-piperidyl)butane tetracarboxylate; tetra(1,2,2,6,6-pentamethyl-4-piperidyl)butane tetracarboxylate; bis (2,2,6,6-tetramethyl-4-piperidyl)-di(tridecyl)butane tetracarboxylate; bis(1,2,2,6,6-pentamethyl-4-piperidyl)-di (tridecyl)butane tetracarboxylate; 3,9-bis[1,1-dimethyl-2-{tris(2,2,6,6-tetramethyl-4-piperidylox ylcarbonyloxy) butylcarbonyloxy}ethyl]-2,4,8,10-tetraoxaspiro[5,5] undecane; 3,9-bis[1,1-dimethyl-2-{tris(1,2,2,6,6-pentamethyl-4-piperidyloxycarbonyloxy) butylcarbonyloxy}ethyl]-2,4,8,10-tetraoxaspiro[5,5] undecane; 1,5,8,12-tetrakis[4,6-bis{N-(2,2,6,6-tetramethyl-4-piperidyl)butylamino}-1,3,5-triazin-2-yl]-1,5,8,12-tetraazadodecane; 1,6,11-tris[{4,6-bis(N-butyl-N-(1,2,2,6,6-pentamethylpiperidin-4-yl)amino)-1,3,5-triazin-2-yl}amino]undecane; a 1-(2-hydroxyethyl)-2,2,6,6-tetramethyl-4-piperidinol/dimethyl succinate condensate; a 2-tertiary-octylamino-4,6-dichloro-s-triazine/N,N'-bis(2,2,6,6-tetramethyl-4-piperidyl)hexamethylenediamine condensate; and a N,N'-bis(2,2,6,6-tetramethyl-4-piperidyl)hexamethylenediamine/dibromoethane condensate.

In addition, examples of the UV absorber include: 2-hydroxybenzophenones such as 2,4-dihydroxybenzophenone, 2-hydroxy-4-methoxybenzophenone, 2-hydroxy-4-octoxybenzophenone, 5,5'-methylenebis(2-hydroxy-4-methoxybenzophenone); 2-(2-hydroxyphenyl)benzotriazoles such as 2-(2-hydroxy-5-methylphenyl)benzotriazole, 2-(2-hydroxy-5-tertiary-octylphenyl)benzotriazole, 2-(2-hydroxy-3,5-di-tertiary-butylphenyl)-5-chlorobenzotriazole, 2-(2-hydroxy-3-tertiary-butyl-5-methylphenyl)-5-chlorobenzotriazole, 2-(2-hydroxy-3,5-dicumylphenyl)benzotriazole, 2,2'-methylenebis(4-tertiary-octyl-6-benzotriazolylphenol), a polyethylene glycol ester of 2-(2-hydroxy-3-tertiary-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tertiary-butylphenyl]benzotriazole, 2-[2-hydroxy-3-(2-methacryloyloxyethyl)-5-tertiary-octylphenyl]benzotriazole, 2-[2-hydroxy-3-(2-methacryloyloxyethyl)-5-tertiary-butylphenyl]-5-chlorobenzotriazole, 2-[2-hydroxy-5-(2-methacryloyloxyethyl)phenyl]benzotriazole, 2-[2-hydroxy-3-tertiary-butyl-5-(2-methacryloyloxyethyl) phenyl]benzotriazole, 2-[2-hydroxy-3-tertiary-amyl-5-(2-methacryloyloxyethyl)phenyl]benzotriazole, 2-[2-hydroxy-3-tertiary-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl] benzo triazole, and 2-[2-hydroxy-4-(3-methacryloyloxypropyl)phenyl]benzotriazole; triazines such as 2-(2-hydroxy-4-methoxyphenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-[2-hydroxy-4-(3-$C_{12}$ to $C_{13}$ mixed alkoxy-2-hydroxypropoxy)phenyl]-4,6-bis(2,4-dimethylphenyl)-1,3,5-triazine, 2-[2-hydroxy-4-(2-acryloyloxyethoxy)phenyl]-4,6-bis(4-methylphenyl)-1,3,5-triazine, 2-[2-hydroxy-4-(2-acetyloxyethoxy)phenyl]-4,6-bisphenyl-1,3,5-triazine, 2-(2,4-dihydroxy-3-allylphenyl)-4,6-bis(2,4-dimethylphenyl)-1,3,5-triazine, 2,4,6-tris(2-hydroxy-3-methyl-4-hexyloxyphenyl)-1,3,5-triazine, and 2-(2-hydroxyphenyl)-4,6-diaryl-1,3,5-triazine; benzoates such as phenyl salicylate, resorcinol monobenzoate, 2,4-ditertiary-butylphenyl-3,5-ditertiary-butyl-4-hydroxybenzoate, hexadecyl-3,5-ditertiary-butyl-4-hydroxybenzoate, and stearyl(3,5-ditertiary-butyl)-4-hydroxybenzoate; substituted oxanilides such as 2-ethyl-2'-ethoxyoxanilide and 2-ethoxy-4'-dodecyloxanilide; and cyanoacrylates such as ethyl-α-cyano-β,β-diphenyl acrylate and methyl-2-cyano-3-methyl-3-(p-methoxyphenyl)acrylate.

Either the hindered amine-based light stabilizers or the UV absorbers may be used, or two or more kinds of them may be used in combination as required. A hindered amine-based light stabilizer is preferably used in terms of emulsion stability.

The light stabilizer emulsion composition of the present invention is obtained by emulsifying and dispersing the light stabilizer emulsion composition in a stable manner by means of an emulsifier and water, and contains 20 to 80 mass %, preferably 30 to 70 mass %, or more preferably 35 to 65 mass % of a light stabilizer or the like. An amount of the light stabilizer or the like of less than 20 mass % is not preferable because a large amount of the composition of the present invention must be added to an aqueous coating agent composition for imparting sufficient weatherability to the aqueous coating agent composition, with the result that the aqueous coating agent composition is diluted with a large amount of water to adversely affect the formation of a coating film. An amount of the light stabilizer or the like in excess of 80 mass % is not preferable either because the stability of the light stabilizer emulsion composition may be reduced.

The emulsifier which can be used for the light stabilizer emulsion composition of the present invention is preferably used in an amount of 1 to 40 mass %, more preferably 2 to 30 mass %, or most preferably 5 to 20 mass % with respect to the light stabilizer or the like. An amount of the emulsifier of less than 1 mass % is not preferable because it cannot perform sufficient emulsification. An amount of the emulsifier in excess of 40 mass % is not preferable either because when the light stabilizer emulsion composition is added to an aqueous coating agent composition and the whole is formed into a coating film, the physical properties of the formed coating film such as water resistance may deteriorate.

A method of producing the light stabilizer emulsion composition of the present invention may adapt any of the known emulsifying methods. The methods include, for example, a phase inversion emulsifying method and a mechanically forced emulsifying method. Anyone of those methods may be used, but the phase inversion emulsifying method is preferably used for emulsification to obtain an emulsion composition with high storage stability. Further, examples of devices to be used for performing those emulsifying methods include a propeller for high-speed agitation, a Homomixer (manufactured by PRIMIX Corporation), a high-pressure homogenizer, and an ultrasonic emulsifier.

The light stabilizer emulsion composition of the present invention can be added to any aqueous composition, provided that the main object of the composition is to improve the weatherability of a coating film, so the composition is preferably added to an aqueous coating agent composition requiring weatherability. Examples of such aqueous coating agent compositions requiring weatherability include: a resin emulsion composition such as aqueous paint; an aqueous ink composition using a coloring agent such as dyes or pigments; an aqueous coating agent composition for paper such as ink-jet paper, heat sensitive paper, or wall paper; a coating agent composition for floors such as wood, tile, or cushion floors; an aqueous coating agent composition for fibers; an aqueous coating agent composition for optics such as a protective layer of an optical recording carrier; and an aqueous coating agent composition intended for protecting and decorating metal, glass, or the like.

The light stabilizer emulsion composition of the present invention is preferably added in such a manner that the amount of the light stabilizer or the like in the light stabilizer emulsion composition is preferably 0.01 to 5 parts by mass, more preferably 0.03 to 3 parts by mass, or most preferably 0.05 to 3 parts by mass with respect to 100 parts by mass of such aqueous coating agent composition. When the amount is less than 0.01 part by mass, the addition may not provide sufficient weatherability. Meanwhile, an amount in excess of 5 parts by mass is not preferable because the weatherability or the like of a coating film may deteriorate.

The light stabilizer emulsion composition of the present invention may be added with another surfactant, an antioxidant, a solvent, or an additive such as an antiseptic as required to the extent that the effect of the present invention is not impaired. Examples of surfactants which can be used include nonionic surfactants, anionic surfactants, cationic surfactants, and amphoteric surfactants.

Examples of the nonionic surfactant include: polyoxyethylene ethers such as polyoxyethylene undecyl ether, polyoxyethylene dodecyl ether, polyoxyethylene tridecyl ether, polyoxyethylene tetradecyl ether, polyoxyethylene pentadecyl ether, polyoxyethylene oleyl ether, and polyoxyethylene nonylphenyl ether; polyoxyethylene esters such as polyoxyethylene oleate, polyoxyethylene sorbitan laurate, and polyoxyethylene sorbitan oleate; Pluronic surfactant of a polyoxyethylene propylene block copolymer or the like.

Examples of the anionic surfactant include: the sulfates, sulfonates, and phosphates of the above-described nonionic surfactants and alcohols; aliphatic acid soap or the like.

Examples of the cationic surfactant include tetraalkyl ammonium salts, alkyl pyridinium salts, and iminium salts or the like.

Examples of the amphoteric surfactant include amino acid-type amphoteric surfactants, betaine-type amphoteric surfactants, sulfate-type amphoteric surfactants, sulfonate-type amphoteric surfactants, phosphate-type amphoteric surfactants or the like.

Examples of the antioxidant include phosphorus-based antioxidants, phenol-based antioxidants, sulfur-based antioxidants, amine-based antioxidant or the like.

Examples of the phosphorus-based antioxidant include: triphenyl phosphite; tris(2,4-ditertiary-butylphenyl)phosphite; tris(2,5-ditertiary-butylphenyl)phosphite; tris(nonylphenyl)phosphite; tris(dinonylphenyl)phosphite; tris(mono, di-mixed nonylphenyl)phosphite; diphenyl acid phosphite; 2,2'-methylenebis(4,6-ditertiary-butylphenyl)octyl phosphite; diphenyldecyl phosphite; diphenyloctyl phosphite; di(nonylphenyl)pentaerythritol diphosphite; phenyldiisodecyl phosphite; tributyl phosphite; tris(2-ethylhexyl) phosphite; tridecyl phosphite; trilauryl phosphite; dibutyl acid phosphite; dilauryl acid phosphite; trilauryl trithiophosphite; bis(neopentylglycol).1,4-cyclohexanedimethyl diphosphite; bis(2,4-ditertiary-butylphenyl)pentaerythritol diphosphite; bis(2,5-ditertiary-butylphenyl)pentaerythritol diphosphite; bis(2,6-ditertiary-butyl-4-methylphenyl)pentaerythritol diphosphite; bis(2,4-dicumylphenyl)pentaerythritol diphosphite; distearylpentaerythritol diphosphite; tetra ($C_{12}$ to $C_{15}$ mixed alkyl)-4,4'-isopropylidene diphenylphosphite; bis[2,2'-methylenebis(4,6-diamylphenyl)]-isopropylidene diphenylphosphite; tetramidecyl.4,4'-butylidenebis(2-tertiary-butyl-5-methylphenol) diphosphite; hexa (tridecyl)-1,1,3-tris(2-methyl-5-tertiary-butyl-4-hydroxyphenyl)butane-triphosphite; tetrakis(2,4-ditertiary-butylphenyl)biphenylene diphosphonite; tris(2-[(2,4,7,9-tetrakis-tertiary-butyldibenzo[d,f][1,3,2]-dioxaphosphepin-6-yl)oxy]ethyl)amine; 9,10-dihydro-9-oxa-10-phosphaphenanthrene-10-oxide; 2-butyl-2-ethylpropanediol.2,4,6-tritertiary-butylphenol monophosphite or the like.

Examples of the phenol-based antioxidant include: 2,6-ditertiary-butyl-p-cresol; 2,6-diphenyl-4-octadecyloxyphenol; stearyl(3,5-ditertiary-butyl-4-hydroxyphenyl)propionate; distearyl(3,5-ditertiary-butyl-4-hydroxybenzyl) phosphonate; tridecyl.3,5-ditertiary-butyl-4-hydroxybenzylthioacetate; thiodiethylenebis[(3,5-ditertiary-butyl-4-hydroxyphenyl)propionate]; 4,4'-thiobis(6-tertiary-butyl-m-cresol); 2-octylthio-4,6-di(3,5-ditertiary-butyl-4-hydroxyphenoxy)-s-triazine; 2,2'-methylenebis(4-methyl-6-tertiary-butylphenol); bis[3,3-bis(4-hydroxy-3-tertiary-butylphenyl)butylic acid]glycol ester; 4,4'-butylidenebis(2,6-ditertiary-butylphenol); 4,4'-butylidenebis(6-tertiary-butyl-3-methylphenol); 2,2'-ethylidenebis(4,6-ditertiary-butylphenol); 1,1,3-tris(2-methyl-4-hydroxy-5-tertiary-butylphenyl)butane; bis[2-tertiary-butyl-4-methyl-6-(2-hydroxy-3-tertiary-butyl-5-methylbenzyl)phenyl] terephthalate; 1,3,5-tris(2,6-dimethyl-3-hydroxy-4-tertiary-butylbenzyl)isocyanurate; 1,3,5-tris(3,5-ditertiary-butyl-4-hydroxybenzyl)-isocyanurate; 1,3,5-tris(3,5-ditertiary-butyl-4-hydroxybenzyl)-2,4,6-trimethylbenzene; 1,3,5-tris[(3,5-ditertiary-butyl-4-hydroxyphenyl)propionyloxyethyl] isocyanurate; tetrakis[methylene-3-(3',5'-ditertiary-butyl-4'-hydroxyphenyl)propionate]methane; 2-tertiary-butyl-4-methyl-6-(2-acryloyloxy-3-tertiary-butyl-5-methylbenzyl) phenol; 3,9-bis[2-(3-tertiary-butyl-4-hydroxy-5-methylhydrocinnamoylox y)-1,1-dimethylethyl]-2,4,8,10-tetraoxaspiro[5,5]undecane; triethylene glycol bis[β-(3-tertiary-butyl-4-hydroxy-5-methylphenyl)propionate]; and tocopherol and a derivative thereof.

Examples of the sulfur-based antioxidant include: dialkylthio dipropionates such as dilauryl, dimyristyl, myristyl stearyl, and distearyl esters of thiodipropionic acid; and β-alkylmercaptopropionates such as pentaerythritol tetra(β-dodecylmercaptopropionate).

Examples of the amine-based antioxidant include: naphthylamine-based antioxidants such as 1-naphthylamine, phenyl-1-naphthylamine, p-octylphenyl-1-naphthylamine, p-nonylphenyl-1-naphthylamine, p-dodecylphenyl-1-naphthylamine, and phenyl-2-naphthylamine; phenylenediamine-based antioxidants such as N,N'-diisopropyl-p-phenylenediamine, N,N'-diisobutyl-p-phenylenediamine, N,N'-diphenyl-p-phenylenediamine, N,N'-di-β-naphthyl-p-phenylenediamine, N-phenyl-N'-isopropyl-p-phenylenediamine, N-cyclohexyl-N'-phenyl-p-phenylenediamine, N-1,3-dimethylbutyl-N'-phenyl-p-phenylenediamine, dioctyl-p-phenylenediamine, phenylhexyl-p-phenylenediamine, and phenyloctyl-p-phenylenediamine; diphenylamine-based antioxidants such as dipyridylamine, diphenylamine, p,p'-di-n-butyldiphenylamine, p,p'-di-t-butyldiphenylamine, p,p'-di-t-pentyldiphenylamine, p,p'-dioctyldiphenylamine, p,p'-dinonyldiphenylamine, p,p'-didecyldiphenylamine, p,p'-didodecyldiphenylamine, p,p'-distyryldiphenylamine, p,p'-dimethoxydiphenylamine, 4,4'-bis(4-α,α-dimethylbenzyl) diphenylamine, p-isopropoxydiphenylamine, and dipyridylamine; and phenothiazine-based antioxidants such as phenothiazine, N-methylphenothiazine, N-ethylphenothiazine, 3,7-dioctylphenothiazine, phenothiazine carboxylate, phenoselenazine or the like.

Examples of the solvent include water-soluble alcohols such as methanol, ethanol, propanol, isopropanol, butanol, isobutanol, tertiary butanol, methyl cellosolve, ethyl cellosolve, and butyl cellosolve.

Examples of the antiseptic include: parabens; quaternary ammonium salts; pyridinium salts; glycols typified by glycerin aliphatic acid esters, glycerin alkyl ethers, and octanediol; sodium alginates; catechins or the like.

The light stabilizer emulsion composition of the present invention can provide weatherability to various kinds of aqueous coating compositions, and can suitably be used for aqueous coating agent compositions such as: aqueous emulsion compositions such as aqueous paint; aqueous ink compositions using coloring agents such as dyes or pigments; aqueous coating agent compositions for paper such as ink-jet paper, heat sensitive paper, or wall paper; coating agent compositions for floors such as wood, tile, or cushion floors; aqueous coating agent compositions for fibers; aqueous coating agent compositions for optics such as a protective layer of an optical recording carrier; and aqueous coating agent compositions intended for protecting and decorating metal, glass, or the like.

Further, the aqueous coating agent composition of the present invention can be obtained by adding the light stabilizer emulsion composition of the present invention to aqueous coating agent compositions such as: aqueous emulsion compositions such as aqueous paint; aqueous ink compositions using coloring agents such as dyes or pigments; aqueous coating agent compositions for paper such as ink-jet paper, heat sensitive paper, or wall paper; coating agent compositions for floors such as wood, tile, or cushion floors; aqueous coating agent compositions for fibers; aqueous coating agent compositions for optics such as a protective layer of an optical recording carrier; and aqueous coating agent compositions intended for protecting and decorating metal, glass, or the like. The light stabilizer emulsion composition of the present invention is preferably added in such a manner that the amount of a light stabilizer is 0.001 to 5 parts by mass with respect to 100 parts by mass of the aqueous coating agent composition.

The aqueous coating agent composition of the present invention may be added with a film-forming auxiliary, a pigment, a dye, an inorganic filler, an organic filler, a dispersant, a viscosity modifier, a defoaming agent, a plasticizer, a curing agent, a curing accelerator, a polymerization inhibitor, a pH adjustor, an oxygen absorbent, or an antiseptic as required.

The aqueous coating agent composition of the present invention can be applied to the surface of each of various substrates such as wood, paper, fiber, concrete, mortar, stone, ceramic, glass, plastics, and metal directly or via base coating. The composition can be applied or printed by means of a known method such as spray coating, brush coating, roll coating, shower coating, immersion coating, electrodeposition coating, printing by means of a printer or the like, or printing by means of a writing utensil such as a, pen.

A coated product of the present invention has a coating film formed of the aqueous coating agent composition of the present invention, and examples thereof include: the outer wall, interior, roof, and floor of a building; the exterior and interior of an automobile; clothing products; leather products; artificial leather products; paper such as ink-jet paper and heat sensitive paper; printed articles; instruments for home and office; and optical materials such as a lens, a plastic film, a substrate, and an optical disk.

EXAMPLES

Hereinafter, the stabilizer emulsion composition and the aqueous coating agent composition of the present invention will be specifically described by way of examples. Unless otherwise stated, "%" in the following examples is on a mass basis.

Note that "EO", "PO", and "BO" represent ethylene oxide, propylene oxide, and butylene oxide, respectively.

(Emulsifier)
A1: Tridecanol 12EO/3PO random copolymer
A2: Tridecanol 25EO/3PO random copolymer
A3: Tridecanol 50EO/5PO random copolymer
A4: Tridecanol 11EO/5PO block copolymer
A5: Tridecanol 15EO/3BO random copolymer
A6: Lauryl alcohol 15EO/3PO random copolymer
A7: Lauryl alcohol 8EO/3PO random copolymer
A8: Oleyl alcohol 20EO/4PO random copolymer
A9: 15EO/3PO random copolymer of 2-ethylhexyl acid
A10: Butanol 6EO/2PO block copolymer
A11: Hexanol 10EO/3PO random copolymer
A12: Tridecanol 5EO/2PO random copolymer
A13: Tridecanol 80EO/20PO random copolymer
B1: Tridecanol 25EO
B2: Lauryl alcohol 12EO
B3: Sodium sulfate of Lauryl alcohol 3EO
B4: H-$(EO)_{80}$—$(PO)_{30}$-$(EO)_{80}$—H
B5: Tetracontanol 30EO/8PO random copolymer (tetracontanol: alcohol having 40 carbon atoms)

(Light Stabilizer and the Like)
C1:

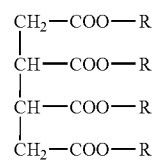

[Chem 1]

(In the formula, R represents the following group (A) or (B): —$C_{13}H_{27}$ and (A)/(B) equals to 1/1 (molar ratio).)

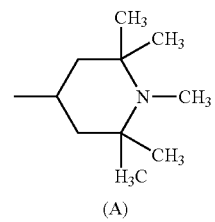

[Chem 2]

(A)

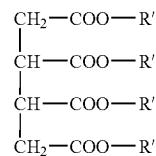

[Chem 3]

(In the formula, R represents the following group (A') or (B): —$C_{13}H_{27}$ and (A')/(B) equals to 1/3 (molar ratio).)

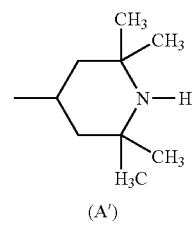

[Chem 4]

(A')

-continued

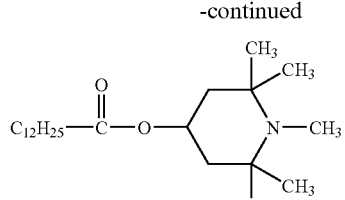

[Chem 5]

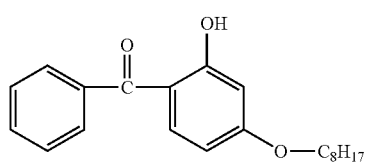

[Chem 6]

(Method of Producing Light Stabilizer Emulsion Composition)

A light stabilizer or the like and an emulsifier were loaded in to a 1,000-ml vessel equipped with a homomixer and a heat-increasing device, and the temperature of the mixture was heated to 60 to 70° C. while the mixture was mixed by means of the homomixer. A predetermined amount of water was gradually charged into the vessel while the situation in the vessel was observed. After a certain amount of water had been charged, a phase inversion from a W/O emulsion to an O/W emulsion occurred. After the phase inversion had been confirmed, the temperature was cooled to 30 to 40° C., and all the remaining water was added. After that, the resultant was continuously stirred for 2 hours to yield a pre-emulsion composition. Table 1 shows the kinds and amounts of the light stabilizer or the like and the emulsion, and the amount of water.

(Storage Stability Test)

To a 100-ml closed vessel made of glass, 80 ml of the resultant light stabilizer emulsion composition was placed and stored for 30 days in a thermostat at 50° C., and the external appearances of the emulsion composition at 10 days, 20 days, 25 days, and 30 days after the beginning of the storage were observed. Table 2 shows the results. In Table 2, ⊚: uniform, ○: surface is slightly separated, Δ: separation of the surface is clear, X: entire nonuniformity or large separation is observed, and XX: complete separation occurs.

(Coating Film Test)

A light stabilizer emulsion composition was added to commercially available gloss paint (Eau de coat G manufactured by NIPPON PAINT Co., Ltd.) in such a manner that the concentration of a light stabilizer or the like would be 1 mass %, and the resultant was stirred until it became uniform. After that, a coating film was formed on a glass plate by means of a 10-mil applicator. After the coating film had been dried, the gloss value of the coating film was measured by means of a gloss meter (VG2000 manufactured by NIPPON DENSHOKU). The gloss value after the addition of the light stabilizer or the like was subtracted from the gloss value before the addition, and the obtained value was defined as the dropped gloss value. The lower the dropped gloss value the less the gloss of the original paint is lost and the better the performance is. Table 3 shows the results.

TABLE 1

(Units of numbers in Table 1 represent mass %)

| | Example | | | | | | | | | | | | | | | | Comparative example | | | | | |
|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 1 | 2 | 3 | 4 | 5 | 6 |
| A1 | 8 | | | | | | | | | | 4 | | | | | | | | | | | |
| A2 | | 8 | | | | | | | | | | 4 | 6 | | | | | | | | | |
| A3 | | | 8 | | | | | | | | | | | | | | | | | | | |
| A4 | | | | 8 | | | | | | | | | | | | | | | | | | |
| A5 | | | | | 8 | | | | | | | | | | | | | | | | | |
| A6 | | | | | | 8 | | | | | | | | | | | | | | | | |
| A7 | | | | | | | 8 | | | | | | | | | | | | | | | |
| A8 | | | | | | | | 8 | | | | | | | | | | | | | | |
| A9 | | | | | | | | | 8 | | | 4 | | | | | | | | | | |
| A10 | | | | | | | | | | 8 | | | | | | | | | | | | |
| A11 | | | | | | | | | | | | | | 8 | | | | | | | | |
| A12 | | | | | | | | | | | | | | | 8 | | | | | | | |
| A13 | | | | | | | | | | | | | | | | 8 | | | | | | |
| B1 | | | | | | | | | | | | | | | | | 8 | | | 4 | | |
| B2 | | | | | | | | | | | | | | | | | | 8 | | | | |
| B3 | | | | | | | | | | | | | | | | | | | 8 | | | |
| B4 | | | | | | | | | | | | | 2 | | | | | | | 8 | 4 | |
| B5 | | | | | | | | | | | | | | | | | | | | | | 8 |
| C1 | 50 | | | | 35 | 60 | | | | 50 | 50 | 50 | 50 | 50 | 50 | 50 | 50 | 50 | 50 | 50 | 50 | 50 |
| C2 | | 50 | | | | | | | | | | | | | | | | | | | | |
| C3 | | | 50 | | | | 40 | 70 | 25 | | | | | | | | | | | | | |
| C4 | | | | 50 | | | | | | | | | | | | | | | | | | |
| Water | 42 | 42 | 42 | 42 | 57 | 32 | 52 | 22 | 67 | 42 | 42 | 42 | 42 | 42 | 42 | 42 | 42 | 42 | 42 | 42 | 42 | 42 |

TABLE 2

Result of storage stability test

| | | After 10 days | After 20 days | After 25 days | After 30 days | Gloss value |
|---|---|---|---|---|---|---|
| Example | 1 | ⊚ | ⊚ | ⊚ | ⊚ | 0.3 |
| | 2 | ⊚ | ⊚ | ⊚ | ⊚ | 0.4 |
| | 3 | ⊚ | ⊚ | ⊚ | ○ | 0.8 |
| | 4 | ⊚ | ⊚ | ⊚ | ⊚ | 0.5 |

TABLE 2-continued

| | | Result of storage stability test | | | | |
|---|---|---|---|---|---|---|
| | | After 10 days | After 20 days | After 25 days | After 30 days | Gloss value |
| | 5 | ◎ | ◎ | ◎ | ◎ | 0.3 |
| | 6 | ◎ | ◎ | ◎ | ◎ | 0.5 |
| | 7 | ◎ | ◎ | ◎ | ◎ | 0.5 |
| | 8 | ◎ | ◎ | ◎ | ◎ | 0.6 |
| | 9 | ◎ | ◎ | ◎ | ○ | 0.7 |
| | 10 | ◎ | ◎ | ◎ | ◎ | 0.4 |
| | 11 | ◎ | ◎ | ◎ | ◎ | 0.5 |
| | 12 | ◎ | ◎ | ◎ | ◎ | 0.6 |
| | 13 | ◎ | ◎ | ◎ | ◎ | 0.3 |
| | 14 | ◎ | ○ | ○ | Δ | 0.9 |
| | 15 | ◎ | ○ | ○ | Δ | 0.7 |
| | 16 | ◎ | ○ | ○ | Δ | 0.8 |
| Comparative Example | 1 | Δ | xx | xx | xx | 3.7 |
| | 2 | Δ | xx | xx | xx | 4.2 |
| | 3 | ◎ | Δ | x | xx | 6.5 |
| | 4 | ◎ | Δ | x | xx | 3.2 |
| | 5 | ◎ | Δ | x | xx | 3.5 |
| | 6 | x | xx | xx | xx | 0.9 |

The invention claimed is:

1. A light stabilizer emulsion composition, comprising:
an emulsifier represented by the following formula (1):

R—O—(AO)$_n$—H  (1)

wherein R represents a hydrocarbon group having 1 to 30 carbon atoms, (AO)$_n$ represents a random copolymer of an ethylene oxide and a propylene oxide, wherein ethylene groups account for 50 mol % to 95 mol % of all A's, and n represents a number of 8 to 80;
at least one of a light stabilizer and a UV absorber; and
water.

2. The light stabilizer emulsion composition according to claim 1, wherein R represents a hydrocarbon group having 8 to 30 carbon atoms.

3. The light stabilizer emulsion composition according to claim 1, wherein R in the formula (1) represents an alkyl group or alkenyl group having 8 to 20 carbon atoms.

4. The light stabilizer emulsion composition according to claim 1, wherein the content of the emulsifier is within a range of 1 to 40 wt % with respect to the content of at least one of the light stabilizer and the UV absorber.

5. The light stabilizer emulsion composition according to claim 1, wherein the light stabilizer comprises a hindered amine compound.

6. The light stabilizer emulsion composition according to claim 1, wherein the content of at least one of the light stabilizer and the UV absorber is within a range of 20 to 80 mass %.

7. An aqueous coating agent composition, comprising the light stabilizer emulsion composition according to claim 1.

8. A coated product, comprising a coating film formed of the aqueous coating agent composition according to claim 7.

* * * * *